United States Patent
Platt et al.

(10) Patent No.: US 9,641,512 B2
(45) Date of Patent: May 2, 2017

(54) IDENTITY PROTOCOL TRANSLATION GATEWAY

(71) Applicant: EMC Corporation

(72) Inventors: Darren C. Platt, Longmont, CO (US); Michael Scott Gile, Superior, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 449 days.

(21) Appl. No.: 14/249,749

(22) Filed: Apr. 10, 2014

(65) Prior Publication Data

US 2015/0295917 A1 Oct. 15, 2015

(51) Int. Cl.
*H04L 29/06* (2006.01)

(52) U.S. Cl.
CPC ...... *H04L 63/0815* (2013.01); *H04L 63/0281* (2013.01); *H04L 69/08* (2013.01)

(58) Field of Classification Search
CPC ............................. H04L 69/08; H04L 63/0815
See application file for complete search history.

(56) References Cited

U.S. PATENT DOCUMENTS

| | | | |
|---|---|---|---|
| 7,725,730 B2 | 5/2010 | Juels et al. | |
| 8,301,901 B2 | 10/2012 | Buss | |
| 8,571,990 B2 | 10/2013 | Buss | |
| 8,572,686 B2 | 10/2013 | Radhakrishnan | |
| 8,613,070 B1 * | 12/2013 | Borzycki | G06F 21/6218 726/8 |
| 8,819,803 B1 | 8/2014 | Richards et al. | |
| 8,850,546 B1 | 9/2014 | Field et al. | |
| 8,925,053 B1 | 12/2014 | Mehta | |
| 8,978,122 B1 | 3/2015 | Zolfonoon et al. | |
| 8,990,911 B2 | 3/2015 | Olden et al. | |
| 2004/0076178 A1 * | 4/2004 | Botton | H04L 29/06 370/466 |
| 2007/0005801 A1 * | 1/2007 | Kumar | H04L 63/08 709/238 |
| 2007/0130326 A1 * | 6/2007 | Raphael | H04L 41/0226 709/224 |
| 2007/0255852 A1 * | 11/2007 | McBride | H04W 12/06 709/246 |
| 2008/0163340 A1 * | 7/2008 | Cheeniyil | H04L 63/20 726/3 |

(Continued)

*Primary Examiner* — Lashonda Jacobs
(74) *Attorney, Agent, or Firm* — BainwoodHuang

(57) ABSTRACT

One or more methods of translating identity protocols and a device and a system implementing such methods are described herein. One such method comprises configuring a gateway to communicate with a first identity protocol and a canonical representation, with the canonical representation being different than the first identity protocol. The method may further comprise: including the first identity protocol in a first communication between a first computing device and the gateway, and translating at least a portion of the first communication from the first identity protocol to a canonical representation. The gateway may then translate the at least a portion of the first communication from the canonical representation to a second identity protocol and sending the first communication to a second computing device, including the first identity information in the second identity protocol in the communication.

23 Claims, 4 Drawing Sheets

(56) References Cited

U.S. PATENT DOCUMENTS

| | | | | |
|---|---|---|---|---|
| 2009/0016325 | A1* | 1/2009 | Al-Bakri | H04L 29/06027 370/352 |
| 2011/0035792 | A1* | 2/2011 | Leitner | G06F 21/41 726/8 |
| 2011/0153800 | A1* | 6/2011 | Cho | H04W 4/20 709/223 |
| 2011/0296027 | A1* | 12/2011 | Salmela | H04L 29/12028 709/226 |
| 2012/0011578 | A1* | 1/2012 | Hinton | H04L 63/0815 726/8 |
| 2012/0072979 | A1* | 3/2012 | Cha | G06F 21/34 726/7 |
| 2012/0254959 | A1* | 10/2012 | Schmidt | H04L 63/061 726/6 |
| 2013/0007858 | A1* | 1/2013 | Shah | H04L 63/0815 726/6 |
| 2014/0230027 | A1* | 8/2014 | Cha | H04L 63/0815 726/5 |
| 2014/0245389 | A1* | 8/2014 | Oberheide | H04L 63/0884 726/3 |
| 2016/0094539 | A1* | 3/2016 | Suresh | H04L 67/025 726/7 |

* cited by examiner

IDENTITY PROTOCOL TRANSLATION GATEWAY

FIELD OF THE INVENTION

The present invention relates to the translation between identity protocols. In particular, but not by way of limitation, the present invention relates to a gateway device performing real-time identity translation between a service provider having a first identity protocol and a service consumer having a second identity protocol different than the first identity protocol.

BACKGROUND OF THE INVENTION

In order for two or more computer systems to communicate with each other, the systems use a language or "protocol" that is understood by each system. During such communication, information comprising the identity of the person/device that initiated the transaction is provided via such a protocol, as part of the message. When the two or more computer systems process this identity information differently, due to differing protocols or otherwise, the computer systems may be inoperable, leading to organizations being unable to communicate. While several different standard identity communication (e.g., single sign-on or "SSO") protocols have been created for varying situations to alleviate this situation, the different standards do not interoperate. For example, several different standards have emerged to enable single sign-on across web applications, including SAML, Shibboleth, OpenID, WS-Federation, and OpenID Connect. Each of these protocols enables an end-user to access varying web applications provided by different organizations with a single log-in. However, the protocols are not interoperable, so an organization that has chosen to use the SAML protocol for SSO often cannot provide SSO to another organization that chose a non-SAML SSO protocol such as, but not limited to, OpenID. As shown by this example, the result is that many computer systems cannot communicate with each other because they were built to speak disparate SSO protocols and are therefore unable to authenticate the users from each other's system.

In addition to the varying separate SSO protocols used throughout the industry, there are often several different incompatible versions of any single SSO protocol. For example, an organization may implement version 1.1 of the SAML protocol and not be able to interoperate with other organizations that implemented SAML 2.0, created to enhance that protocol's capability. The result is that it requires a very significant time and money investment for an organization to integrate all of their technology internally, and even more of an investment in time and money to set up this kind of SSO integration between organizations. This proliferation of approaches to user and session identity management has made it very difficult to adopt the technology in a way that enables collaboration between enterprises.

In addition to the inability of companies to interact with each other due to the different identity protocols being implemented, identity information may also be conveyed in varying ways which are not accepted across protocols during web service calls made between two computer systems. The two current standards used by these web service calls, SOAP and REST, each have a variety of ways of including the necessary identity information in their requests. This variance makes it very difficult for one organization (e.g., a company using SOAP with WS-Security) to make a web service call in order to obtain data from a second organization's computing infrastructure when the second organization has tools and technology for using REST with OAuthV2 for security. As a result, if the organizations are to work together in this technical way, one of them will have to make a significant investment to modify their infrastructure to provide/consume the identity information the way their partner expects.

SUMMARY OF THE INVENTION

In order to overcome the inability for many organizations to operate together due to identity protocol inoperability, what is needed is a way for each implementation of various identity protocols to interact seamlessly, without the need for implementing a proprietary system having a high cost of time and money. In order to facilitate those interactions, an identity translation protocol gateway has been created. One such device is adapted to implement a method of translating identity protocols. In one embodiment, the method comprises configuring the gateway to communicate with a first identity protocol and configuring the gateway to communicate with a second identity protocol, with the second identity protocol being different than the first identity protocol. A first communication between a first computing device and the gateway may comprise the first identity protocol, with the first identity protocol comprising information about the identities of one or more people associated with the request. Upon receiving the first communication, the identity information may be translated to a canonical representation of the information. Such a canonical representation may comprise additional information obtained by the gateway or otherwise provided to the gateway. For example, additional identification information may be included in the canonical representation such as, but not limited to, user roles, user/device location, or device-related information (device type, etc.). From the canonical representation, the information may be translated to a second identity protocol comprising the information. Through such a manner, the contents of the first communication may be sent to a second computing device, with the first communication's contents translated to a second identity protocol.

Another embodiment of the invention comprises a non-transitory, tangible computer readable storage medium, encoded with processor readable instructions to perform a method of communicating between computing devices. One such method comprises receiving a first communication that is sent from a first computing device to a second computing device. The first communication may contain a first identity protocol and may be received at a gateway. The method may further comprise translating the information about the identities of one or more people associated with the request in the first communication from the first identity protocol to a canonical representation and subsequently translating the canonical representation of the information to a second identity protocol comprising the information. At such a time, the information from the first communication may be sent to the second computing device in a second identity protocol.

Yet another embodiment of the invention comprises an identity protocol translation computing device. One such identity protocol translation computing device comprises a first connector portion adapted to communicate with a first identity protocol. The identity protocol translation computing device may also comprise a second connector portion adapted to communicate with a second identity protocol, as well as one or more processing engines and transformation rules adapted to process and translate the information in the first identity protocol communication to a canonical representation of the information and from the canonical representation to information within a second identity protocol message.

The above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
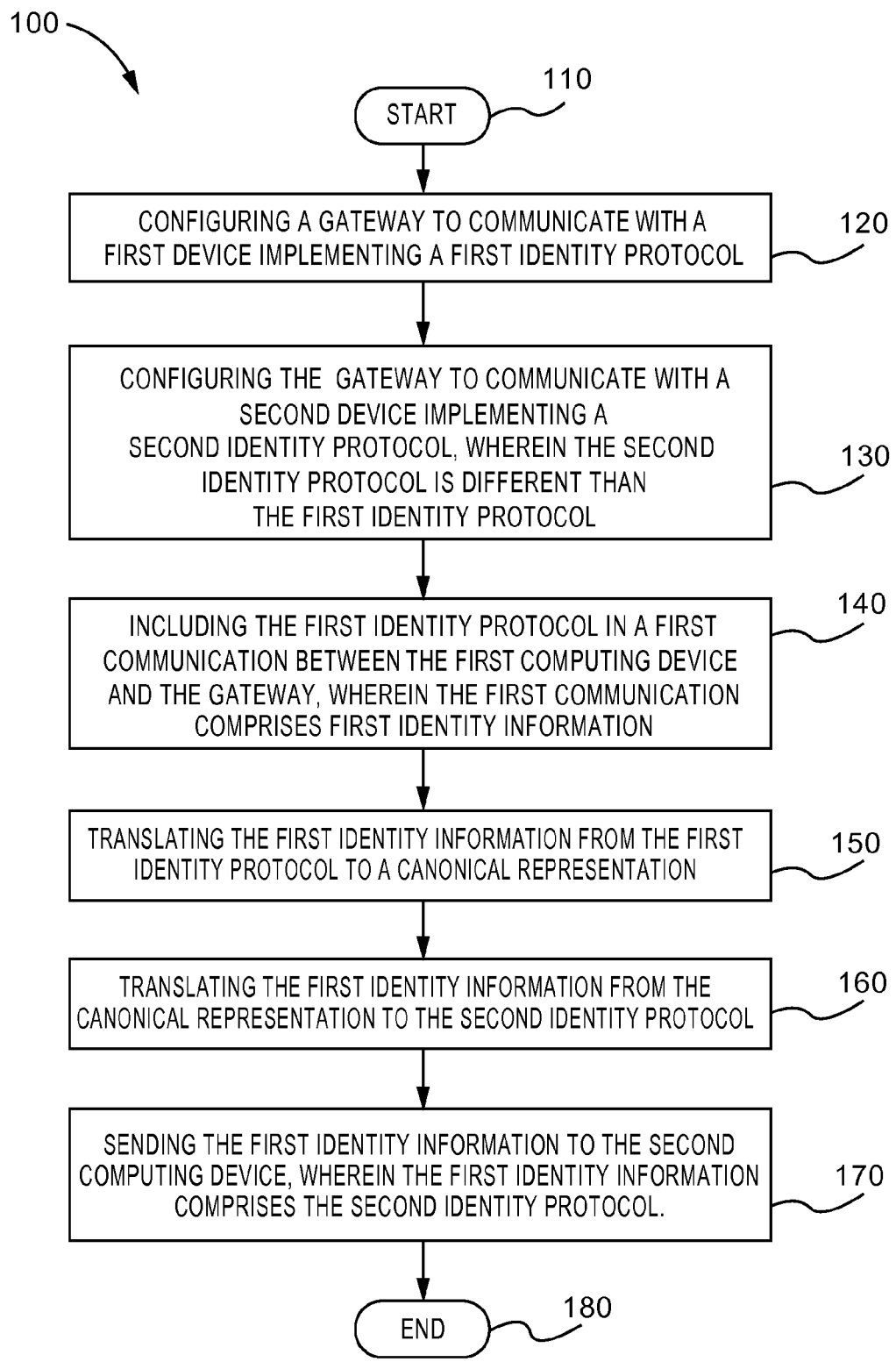
FIG. 1 depicts a method of translating identity protocols according to one embodiment of the invention.
Figure 2:
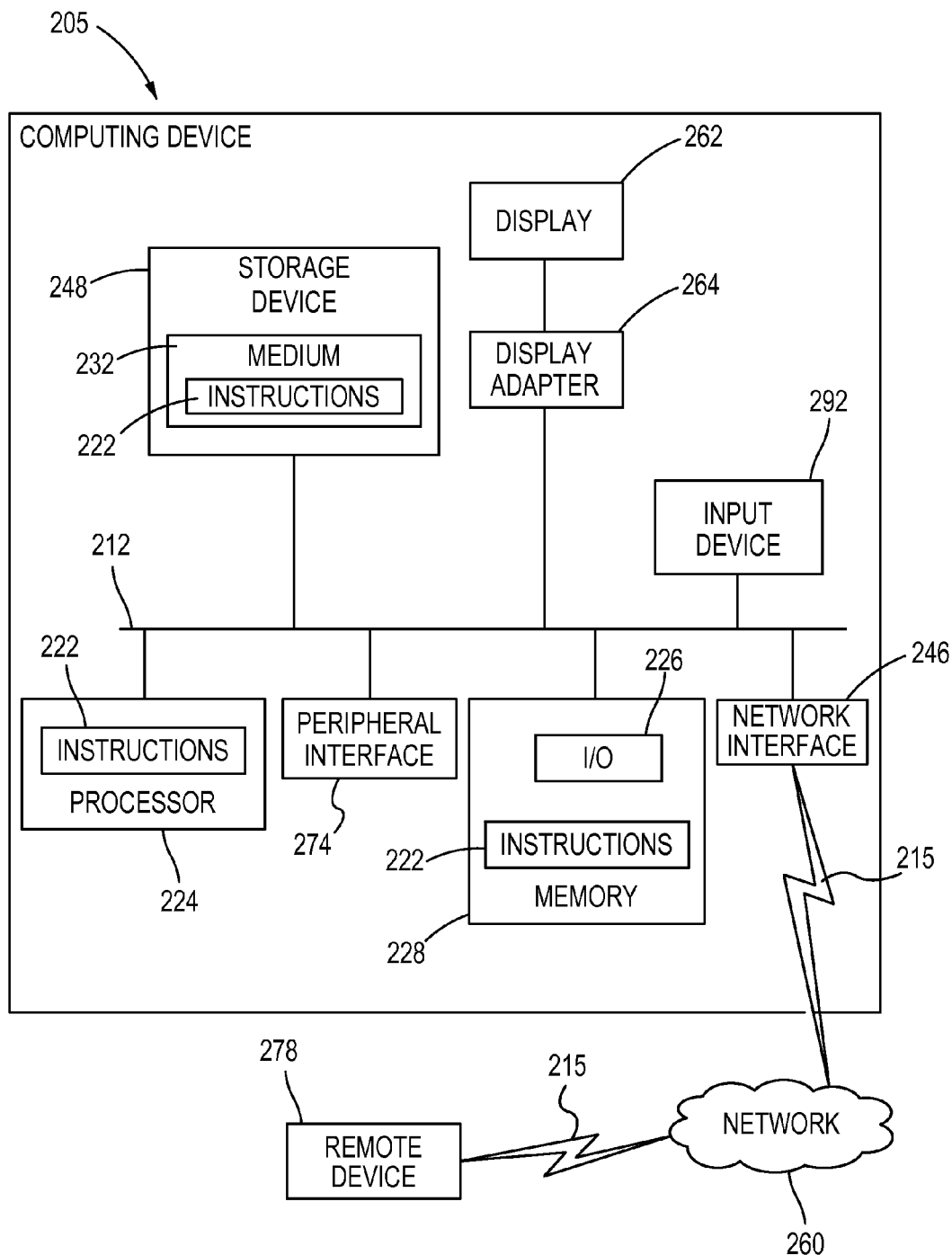
FIG. 2 depicts a block diagram of a computing device according to one embodiment of the invention.
Figure 3:
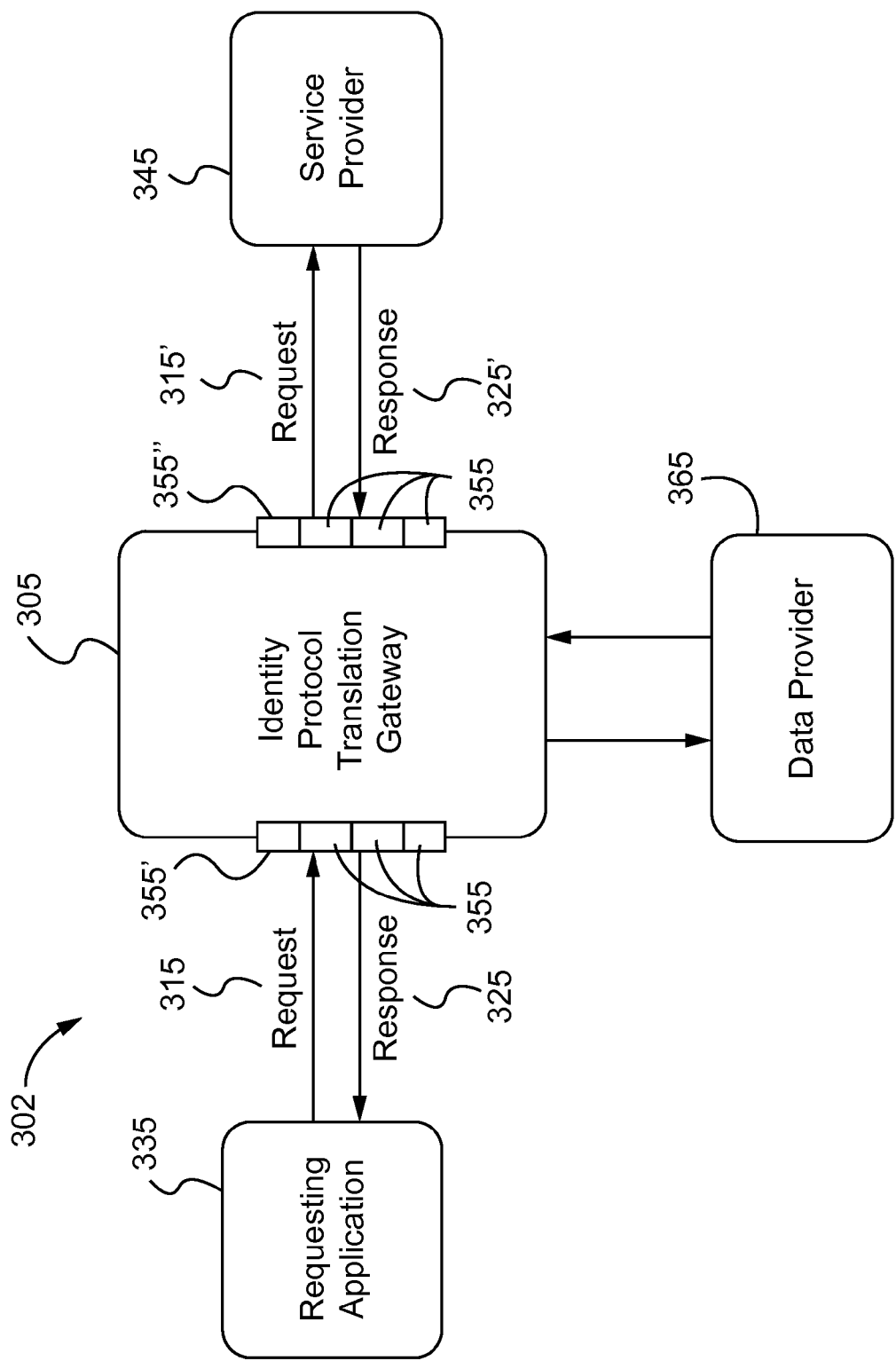
FIG. 3 depicts a block diagram of at least a portion of a method of communicating between computing devices according to one embodiment of the invention.

Turning first to FIG. 1, seen is a method 100 of translating identity protocols. Identity protocols may comprise data information related to SSO authentication, user account provisioning (i.e., creation), access control, and auditing. Such a method 100 as seen in FIG. 1 may be implemented by one or more computing devices such as, but not limited to, the identity protocol translation gateway ("IPTG") 205 described herein and shown with reference to FIG. 2. The identity protocol translation gateway ("IPTG") 205 may also simply be referred to herein as a gateway and may comprise a device or a plurality of devices. For example, one or more portions or features described herein may reside on a plurality of cloud-based devices or systems. Such a method 100 and IPTG 205 may enable two systems, operating previously incompatible identity protocols, to communicate without making any changes to their existing systems. For example, as seen in FIG. 3, the IPTG device 305 may be communicatively located between two organizations comprising such systems. It is contemplated that the term organization may also be referred to herein as a computing device or a plurality of computing devices such as, but not limited to, a first computing device 335 and second computing device 345. The two organizations wish to exchange information, including at least one of requesting 315 and receiving information in a response 325 to, for example, an SSO or a web service call. Through the method 100 and/or device 305, the requests 315 and responses 325 sent between the organizations may be modified in such a way that the requests 315 and responses 325 can be natively understood by each organization without requiring them to implement additional hardware and/or software at the organization in order to support a new identity or security protocol being run by the other organization. Such an IPTG device 305 may be operated by either of the organizations participating in the request 315/response 325 transaction, and/or the IPTG device 305 may be operated by a third party.

In one such embodiment, the IPTG 305 may comprise a service that receives messages from a consumer such as, but not limited to, a requesting application on a first computing device 335. The IPTG 305 may translate the information such as, but not limited to, identity information in those messages into a common canonical form, and then translate the message from the canonical form into a form that the message receiver, such as, but not limited to a second computing device 345 comprising a service provider, understands. Identity information received from a first computing device 335 may comprise first identity information and identity information received from a second computing device 345 may comprise second identity information. Therefore, the IPTG 305 may send the request 315 message received from the application to the service provider, using the identity protocol that service provider has implemented, and also accepts the response 325' from the service provider, which may comprise a server in one embodiment, in the same protocol. The IPTG 305 may then translate the information provided in the response 325 into a format that can be understood by the original calling application at the first computing device 335. In one embodiment, the IPTG 305 may implement a connector 355 for each protocol supported. Connectors 355 may comprise modules (i.e., software modules) which translate the messages to and from the protocol implemented in the message—such as, but not limited to a standard protocol (e.g., SAML or proprietary), to and from, for example, a canonical representation of the information in the message.

During such communications seen in FIG. 3, the identity information of the communication may be passed between the first computing device 335 and second communication device 345, along with any other information entered into the communication during the canonical representation step. For example, additional information related to the first computing device 335 and second communication device 345 may be entered into the communication. Such additional information may comprise a location of the user or device or a desired language, etc. Through this identity and additional information, the devices 335, 345 may be informed which end-user initiated the transaction. Identity information may be provided through the use of a username/password combination and/or additional information provided from a user and/or computing device. The IPTG 305 provides the translation of the identity information.

Seen in FIG. 1 is one a method 100 of translating identity protocols. Such a method starts at 110 and at 120 comprises configuring a gateway to communicate with a first identity protocol. For example, prior to sending a communication between the first computing device 335 and the second computing device 345, the IPTG 305 may be configured to properly communicate with the first computing device 335. Such configuration may comprise implementing one or more modules, or connectors 355. The connectors may comprise instructions residing on a non-transitory, tangible computer readable storage medium in the IPTG 305, informing the IPTG 305 how to properly process the first identity protocol associated with communications sent from and to the first computing device 335. Configuration may also include implementing one or more modules or connectors at the first computing device 335 such that communications to and/or from the first computing device 335 may be routed through the IPTG 305. Upon such configuration, the IPTG 305 may be able to receive communications from the first computing device 335 and construct or otherwise obtain the identity information provided with the communication. Similarly, the IPTG 305 may be able to configure and send a communication comprising the identity information in first identity protocol to the first computing device 335. For example, the response 325' from the second computing device 345 may be sent to the first computing device 335 with the first identity protocol comprising identity information related to the second computing device 345. In a similar manner the IPTG 305 may be configured to communicate with additional computing devices such as, but not limited to the second computing device 345. Communications associated with each additional computing device may comprise a different identity protocol. As such, at step 130, the method 100 comprises configuring the gateway via the use of one or more connectors 355 to communicate with a second identity protocol, wherein the second identity protocol is different than the first identity protocol.

At step 140, the method 100 comprises including the first identity information in a first identity protocol communication between the first computing device and the gateway. The first communication may comprise a communication set from the first computing device 335 to the second computing device 345, which is routed through the IPTG 305 through the use of the connectors 355. Additional connectors (not shown) may be used at the first and second computing devices. The communication may comprise a SSO communication or web service call comprising a first identity protocol. The IPTG device 305 may receive the communication—identified as the request 315 in FIG. 3 and, as seen at step 150 of the method 100 of FIG. 1, may then translate the information in the first communication, including the identity information, from the first identity protocol to a canonical representation of the information. In one embodiment, this step may comprise the portion of the communication sent from the first computing device 335 which comprises the identity information being modified from the first identity protocol used by the first computing device 335 into a canonical format.

At step 160, the method 100 comprises translating the identity information in the first communication from the canonical representation to a second identity protocol used by the second computing device. For example, similar to step 150, translating the identity information received in the first communication from the canonical representation to a second identity protocol may comprise taking the portion of the first communication comprising the canonical identity data (e.g., the canonical identity format) and translating that to the second identity protocol, where the second identity protocol is the protocol used by the second computing device 345. At step 170, the method 100 comprises sending the identity information originally received via first communication in the first communication 315 to the second computing device 345 via the second communication 315' with the second communication 315' comprising the second identity protocol accepted by the second computing device 345. As the second communication 315' comprises the identity protocol that the second computing device 345 is adapted to receive and respond to, the second computing device 345 may receive the communication, access the identity information therein, and provide any desired response 325.

The method 100 seen in FIG. 1 may also comprise additional detail or additional steps not seen in FIG. 1. For example, not seen in FIG. 1 is that the first communication may be received at the IPTG device 305 by an application operating on the first computing device 335. It is also contemplated that the first computing device 335 may comprise one or more devices such as, but not limited to including an application infrastructure device such as, but not limited to, a SAML device. As previously stated, it is also contemplated that the first communication comprises a communication requesting a web service from a second computing device 345, which may comprise a server hosting the service. Furthermore, the first computing device 335 and/or the second computing device 345 may be use an identity protocol comprising one or more of SAML, Shibboleth, OpenID, WS-Federation, OpenID Connect, SOAP, REST, and a proprietary protocol. It is contemplated that the application on the first computing device 335 and/or second computing device 345 may comprise information related to the IPTG 305 and may automatically inform the IPTG device 305 of the identity protocol running on the device. The IPTG device 305 may subsequently automatically configure the IPTG 305 to operate with that identity protocol.

One method 100 may comprise the additional step of sending a second communication to the IPTG 305 from the second computing device 345. One such second communication may comprise the second identity protocol and may also comprise the response 325' seen in FIG. 3. Upon receiving the second communication, the IPTG 305 may translate the identity information in the second communication from the second identity protocol to a canonical representation of the identity information in the second communication 325' and then translate the canonical representation of the identity information to the first identity protocol prior to sending the information to the first computing device 335, as shown by the response 325 in FIG. 3. The response 325 comprises the first identity protocol.

FIG. 3 also shows a data provider 365. One data provider may comprise a separate device from the IPTG 305, first computing device 335, second computing device 345 or another other device in an identity protocol translation system 302. For example, the data provider 365 may comprise a third-party device and/or service. However, it is also contemplated that the data provider 365 a portion of the IPTG 305, first computing device 335, second computing device 345 or another other device in an identity protocol translation system 302. The data provider 365 may be adapted to add information to the identity information in first communication sent from the first computing device 335 or to the second communication sent from the second computing device 345. For example, information related to at least one of the first computing device and the second computing device may be added to the communication. Such information may comprise location information, a device type, and/or interests associated with a user or users of the device. Such information, or any other information which may be obtained or provided by the IPTG 305, first computing device 335, second computing device 345 or another other device in an identity protocol translation system 302 may be used by a service provider (e.g., credit score provided from a third party, etc.). It is also contemplated that the additional information may comprise information about the origination of the request and/or more information about the end user or originator of the request. In some cases the IPTG 305 may enforce policies about what functions a given user or organization is allowed to perform. For example, if the IPTG 305 may receive a request 315 for information that the IPTG 305 determines, based on a user's or a device's provided identity information and one or more preconfigured policy within the IPTG 305, should not be provided. In such a case, the IPTG 305 may terminate the request 315 prior to the IPTG 305 sending the request 315 to the service provider. Therefore, in one embodiment, the IPTG 305 also performs additional functions beyond the identity protocol translation described herein such as, but not limited to, enforcing rules related to whether requested information may be provided to a user/device, based on the identity information provided and other contextual information with the request. Such contextual information may comprise, for example, the location of the requesting device, the time of the requesting device, etc. Turning now to FIG. 2 seen is a diagrammatic representation of one embodiment of a machine in the exemplary form of the IPTG 205 or any other device comprising a portion of the system 302 seen in FIG. 3. Such an IPTG 205 comprises one or more sets of instructions 222 for causing one or more system 302 devices to perform any one or more of the aspects and/or methodologies of the present disclosure. IPTG 205 includes the processor 224, which communicates with the memory 228 and with other components, via the bus 212. Bus 212 may include any of several types of bus structures including, but not limited to, a memory bus, a memory controller, a peripheral bus, a local bus, and any combinations thereof, using any of a variety of bus architectures.

Memory 228 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 226 (BIOS), including basic routines that help to transfer information between elements within IPTG 205, such as during start-up, may be stored in memory 228. Memory 228 may also include (e.g., stored on one or more machine-readable media) instructions (e.g., software) 222 which may comprise the various modules connectors 355 with reference to FIG. 3 and may also comprise the non-transitory, tangible computer readable storage medium, which are described herein as encoded with processor readable instructions to perform, for example, a method of communicating between computing devices and/or a method of translating identity protocols. The instructions 222 may embody any one or more of the aspects and/or methodologies of the present disclosure. In another example, memory 228 may further include any number of program modules including, but not limited to, an operating system, one or more application programs, other program modules, program data, and any combinations thereof.

IPTG 205 may also include a storage device 248. Examples of a storage device (e.g., storage device 248) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 48 may be connected to bus 212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 248 may be removably interfaced with IPTG 205 (e.g., via an external port connector (not shown)). Particularly, storage device 248 and an associated machine-readable medium 232 may provide nonvolatile and/or volatile storage of machine-readable instructions, data structures, program modules, and/or other data for IPTG 205. In one example, instructions 222 may reside, completely or partially, within machine-readable medium 232. In another example, instructions 222 may reside, completely or partially, within processor 224. Such instructions may comprise, at least partially, the instructions and methods mentioned herein.

IPTG 205 may also include an input device 292. In one example, a user of IPTG 205 may enter commands and/or other information into IPTG 205 via input device 292. Examples of an input device 292 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 292 may be interfaced to bus 212 via any of a variety of interfaces (not shown) including, but not limited to, a serial interface, a parallel interface, a game port, a USB interface, a FIREWIRE interface, a direct interface to bus 212, and any combinations thereof.

A user may also input commands and/or other information to IPTG 205 via storage device 248 (e.g., a removable disk drive, a flash drive, etc.) and/or a network interface device 246. In one embodiment, the network interface device 246 may comprise a wireless transmitter/receiver and/or may be adapted to enable communication between the one or more of the first computing device 335, second computing device 345, IPTG device 305, and data provider 365. The network interface device 246 may be utilized for connecting IPTG 205 to one or more of a variety of networks 260 and a remote device 278. Examples of a network interface device 246 include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network may employ a wired and/or a wireless mode of communication. In general, any network topology may be used. Information (e.g., data, software, etc.) may be communicated to and/or from IPTG 205 via network interface device 246.

IPTG 205 may further include a video display adapter 264 for communicating a displayable image to a display device, such as display device 262. Examples of a display device include, but are not limited to, a liquid crystal display (LCD), a cathode ray tube (CRT), a plasma display, and any combinations thereof. In addition to a display device, IPTG 205 may include one or more other peripheral output devices including, but not limited to, an audio speaker, a printer, and any combinations thereof. Such peripheral output devices may be connected to bus 212 via a peripheral interface 274. Examples of a peripheral interface include, but are not limited to, a serial port, a USB connection, a FIREWIRE connection, a parallel connection, and any combinations thereof. In one example an audio device may provide audio related to data of IPTG 205 (e.g., data related to the first communication described with reference to FIG. 3).

A digitizer (not shown) and an accompanying stylus, if needed, may be included in order to digitally capture freehand input. A pen digitizer may be separately configured or coextensive with a display area of display device 262. Accordingly, a digitizer may be integrated with display device 262, or may exist as a separate device overlaying or otherwise appended to display device 262.

In one embodiment, one or more medium 232 may comprise a non-transitory, tangible computer readable storage medium 232, encoded with processor readable instructions 222 to perform a method of communicating between computing devices such as, but not limited to, the first computing device 335 and the second computing device 345 seen in FIG. 3. One such method may comprise receiving a first communication sent from the first computing device 335 to the second computing device 345, with the first communication comprising a first identity protocol and being received at a third computing device such as, but not limited to the device 305. For example, the first communication may be re-routed from a first destination comprising a second computing device to a second destination comprising the third computing device. Such a communication may comprise a web service call from an application or an application infrastructure communication. It is also contemplated that the communication may include a token and that the third computing device may use the token in translating the identity information from the first identity protocol to a canonical representation of the information and/or translating the canonical representation to information comprising a second identity protocol. A token (the same or different) may also be provided in a second communication sent from the second computing device 345.

The method performed by the processor readable instructions 222 may further comprise translating the identity information from the first identity protocol to a canonical representation, translating the information from the canonical representation to a second identity protocol, and sending the information originally sent in the first communication to the second computing device 345 from the IPTG 305, at which point the identity information from the first communication comprises the second identity protocol.

The non-transitory, tangible computer readable storage medium 232 may further comprise instructions 222 which are adapted to configure the IPTG device 305 or other gateway so that the gateway may communicate with the first identity protocol and the canonical representation, prior to receiving the first communication from the first computing device 335. Furthermore, via the instructions 222, the first connector 355' may be adapted to communicate with the first computing device 335 and the second connector 355" may be adapted to communicate with the second computing device 345. Additional connectors 355 may also be implemented in order to communicate with additional identity protocols. Furthermore, information may be added to the communications at the IPTG 305 by the instructions 222, the information being related to at least one of, the first computing device and the second computing device.

Figure 4:
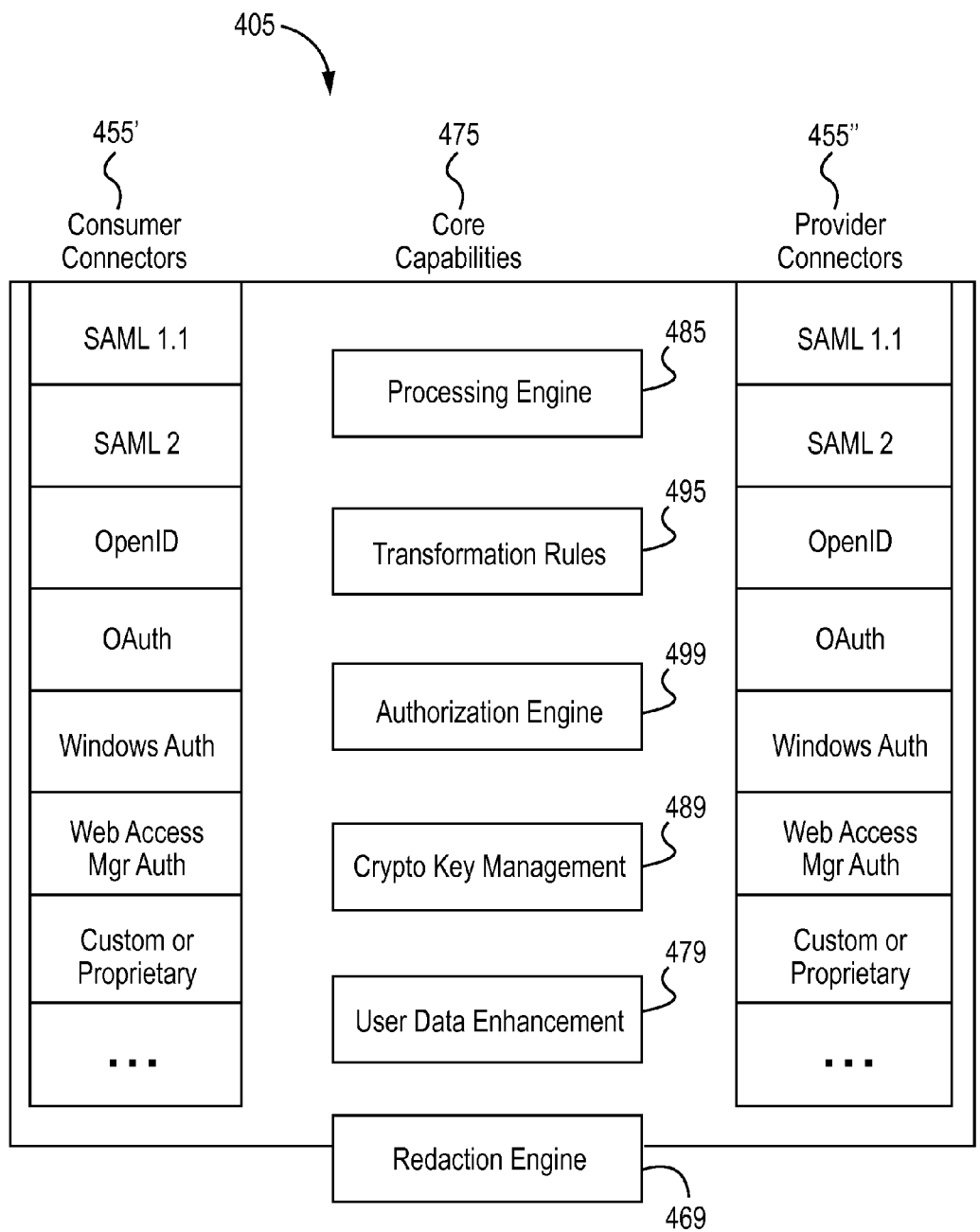
FIG. 4 depicts a gateway comprising identity protocol specific connectors according to one embodiment of the invention.

Turning now to FIG. 4, seen is a representation of one embodiment of an IPTG device 405. Seen are the various connectors 455, with the first connectors 455' being adapted to enable the IPTG device 405 to communicate with the listed first identity protocol examples shown and the second connectors 455" being adapted to enable the IPTG device 405 to communicate with the listed second identity protocol examples. Although only certain identity protocols are shown, it is contemplated that additional identity protocols will be developed in the future, for which additional connectors 455 will be created and implemented. Therefore, the first connector may receive a request 315 to communicate with a SAML 2.0 identity protocol from the first computing device 335, but may send the request 315 to the second computing device 345 with a SAML 1.1 identity protocol via a second identity connector. Similarly, the response 325' from the second computing device 345 may comprise a SAML 1.1 identity protocol but the response 325 sent to the first computing device 335 may comprise the SAML 2.0 identity protocol. As seen, such an embodiment may comprise an identity protocol version translation. SSO protocol translation may also occur—for example between a SAML SSO request 315/response 325 from/to the first computing device 335 and an OpenID SSO request 315/response 325' to/from the second computing device 345. Web service identity protocol translation may also occur—for example, between a REST OAuth V2 request 315/response 325 communication sent from/to the first computing device 335 and a Username Token Secured request/response 325 communication sent to/from the second computing device 345. Similarly, a web service identity protocol translation may occur. For example, the first computing device 335 may issue a request 315 and receive a response 325 comprising a username/password in a REST protocol, while the second computing device 345 may receive the request 315 and issue a response 325' comprising a REST OAuthV2 communication.

Also seen in FIG. 4 are various features 475 of the IPTG device 405. One such feature 475 comprises the processing engine 485. In one embodiment, the processing engine 485 may be adapted to process the requests 315 and responses 325, and may include caching one or more portions of the information in the requests 315 and/or responses 325. The transformation rules 495 may be adapted to transform the data within various identity protocols into and from a canonical format while the authorization engine 499 may be adapted to enforce varying application access policies for the identity information provided in the request 515/response 525. The crypto key management 489 portion may be adapted to perform encryption and/or decryption of the request 515 and response 525 communications, while the user data enhancement 479 portion adds information to the communications, through, for example, the data provider 365 feature described above. Finally, the redaction engine 469 may remove information from the communications, based upon the identity information received and the context in the communications, working together with the authorization engine 499 to do so in one embodiment.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method of translating identity protocols comprising,
configuring a gateway to communicate with a first device implementing a first identity protocol;
configuring the gateway to communicate with a second device implementing a second identity protocol, wherein the second identity protocol is different than the first identity protocol;
including the first identity protocol in a first communication between the first computing device and the gateway, wherein the first communication comprises first identity information;
translating the first identity information from the first identity protocol to a canonical representation;
translating the first identity information from the canonical representation to the second identity protocol; and
sending the first identity information to the second computing device, wherein the second identity protocol comprises the first identity information.

2. The method of claim 1 wherein, the first communication between the first computing device and the gateway comprises a communication that is one of,
received at the gateway from a first computing device application; and sent from one of,
a service consumer, and
an application infrastructure device.

3. The method of claim 2 wherein, the first communication further comprises a web service call.

4. The method of claim 2 wherein, the application infrastructure device comprises a device implementing at least one of,
SAML;
Shibboleth;
OpenID;
WS-Federation;
OpenID Connect;
SOAP;
REST; and
a proprietary protocol.

5. The method of claim 1 further comprising,
sending a second communication to the gateway from the second computing device, wherein the second communication comprises,
second identity information, and
the second identity protocol;
translating the second identity information from the second identity protocol to the canonical representation;
translating the second identity information from the canonical representation to the first identity protocol; and
sending the second communication to the first computing device, wherein the second identity information comprises the first identity protocol.

6. The method of claim 5 further comprising, adding additional information at the gateway to at least one of the first communication and the second communication, the additional information being related to at least one of,
the first computing device;
the second computing device;
an end user; and
a context related to the transaction.

7. The method of claim 6 wherein,
the additional information comprises at least one of,
identity information,
a preferred end user language; and
the second computing device comprises a service provider.

8. A non-transitory, tangible computer readable storage medium, encoded with processor readable instructions to perform a method of communicating between computing devices comprising,
receiving a first communication sent from a first computing device to a second computing device, wherein, the first communication,
comprises a first identity protocol, and,
is received at a gateway;
translating the first identity protocol to a canonical representation;
translating the canonical representation to a second identity protocol; and
sending the first identity information to the second computing device,
wherein the second identity protocol comprises the first identity information.

9. The non-transitory, tangible computer readable storage medium of claim 8 further comprising,
configuring the gateway to communicate with the first identity protocol and the second identity protocol prior to receiving the first communication.

10. The non-transitory, tangible computer readable storage medium of claim 9 wherein,
configuring the gateway to communicate with the first identity protocol comprises implementing a first connector at the gateway to communicate with the first computing device; and
configuring the gateway to communicate with the second identity protocol comprises implementing a second connector at the gateway to communicate with the second computing device.

11. The non-transitory, tangible computer readable storage medium of claim 10, further comprising, configuring the gateway to communicate with at least one additional identity protocol, wherein, configuring the gateway to communicate with the at least one additional identity protocol comprises implementing at least one additional connector at the gateway to communicate with the at least one additional identity protocol.

12. The non-transitory, tangible computer readable storage medium of claim 8 wherein, prior to receiving the communication, the communication is re-routed from a first destination comprising the second computing device to a second destination comprising a gateway device.

13. The non-transitory, tangible computer readable storage medium of claim 8 wherein, the communication comprises one of,
a web service call from an application; and
an application infrastructure communication.

14. The non-transitory, tangible computer readable storage medium of claim 8 wherein,
the communication comprises a token; and
at least one of translating the first identity protocol to a canonical representation and translating the canonical representation to a second identity protocol comprises using the token to perform the translation.

15. The non-transitory, tangible computer readable storage medium of claim 8, further comprising, adding information at the gateway to at least one of the first communication and the second communication, the information being related to at least one of,
the first computing device;
the second computing device
an end user; and
a context related to the transaction.

16. An identity protocol translation computing device comprising,
a first connector portion adapted to communicate with a first identity protocol;
a second connector portion adapted to communicate with a second identity protocol; and
one or more processing engines and transformation rules adapted to process and translate,
identity information from the first identity protocol to a canonical representation, and
the canonical representation to the second identity protocol,
wherein the second identity protocol comprises the identity information.

17. The identity protocol translation computing device of claim 16, further comprising,
at least one authorization engine; and
at least one redaction engine, wherein,
the at least one authorization engine and at least one redaction engine are adapted to modify the information sent to one or more computing devices, based on one or more received additional identity information.

18. The identity protocol translation computing device of claim 16, further comprising a crypto key management portion, wherein the crypto key management portion is adapted to encrypt and decrypt information sent from/to the identity protocol translation device.

19. The identity protocol translation computing device of claim 16, further comprising a user data enhancement portion wherein, the user data enhancement portion is adapted to add information to one or more communications sent one of from and to the identity protocol translation computing device.

20. The identity protocol translation computing device of claim 16, wherein, one of the first connector portion and the second connector portion is adapted to communication with one or more of a protocol comprising,
SAML 1.1;
SAML 2;
OpenID;
OAuth;
Windows Auth;
Web Access Mgr Auth; and
at least one of a custom and a proprietary protocol.

21. The method of claim 1, further comprising:
receiving, from a data provider that is a separate device from the gateway and first computing device, additional identity information related to the first computing device;
including the additional identity information in the canonical representation prior to translating the first identity information from the canonical representation to the second identity protocol;
determining, responsive to the additional identity information, whether the first communication between the first computing device and the gateway is a request for information that should not be provided;
wherein sending the first identity information to the second computing device is responsive to determining that the first communication between the first computing device and the gateway is not a request for information that should not be provided; and
terminating the first communication between the first computing device and the gateway without sending the first identity information to the second computing device in response to determining that the first communication between the first computing device and gateway is a request for information that should not be provided.

22. The method of claim 21, wherein the additional identity information includes a location of the first computing device, a type of the first computing device, and at least one interest associated with a user of the first computing device.

23. The method of claim 22, further comprising removing, by a redaction engine within the gateway responsive to the additional identity information, information from the first communication between the first computing device and the gateway prior to sending the first identity information to the second computing device.

* * * * *